United States Patent [19]
Herberg

[11] 3,996,741
[45] Dec. 14, 1976

[54] ENERGY STORAGE SYSTEM

[76] Inventor: George M. Herberg, Gonvick, Minn. 56644

[22] Filed: June 5, 1975

[21] Appl. No.: 583,968

[52] U.S. Cl. .................................. 60/398; 60/413; 60/415; 60/501
[51] Int. Cl.² ........................................ F15B 21/00
[58] Field of Search ............ 60/398, 413, 415, 641, 60/497, 501; 417/331, 337

[56] References Cited
UNITED STATES PATENTS 3,895,493   7/1975   Rigollot ........................ 60/398 X Primary Examiner—Allen M. Ostrager
Attorney, Agent, or Firm—Burd, Braddock & Bartz

[57] ABSTRACT

A system and apparatus for the storage of energy generated by natural elements. Energy from natural elements such as from the sun, wind, tide, waves, and the like, is converted into potential energy in the form of air under pressure which is stored in a large, subterranean cell. Machines of known types such as windmills are driven by natural elements to operate air compressors. Air compressors pump the air under pressure to the storage cell. Air entering the storage cell displaces water from the cell which returns to a water reservoir as an ocean or a lake. Water locks the air in the storage cell. The stored compressed air is available upon demand to perform a work function as driving an air turbine to operate an electric generator.

4 Claims, 2 Drawing Figures

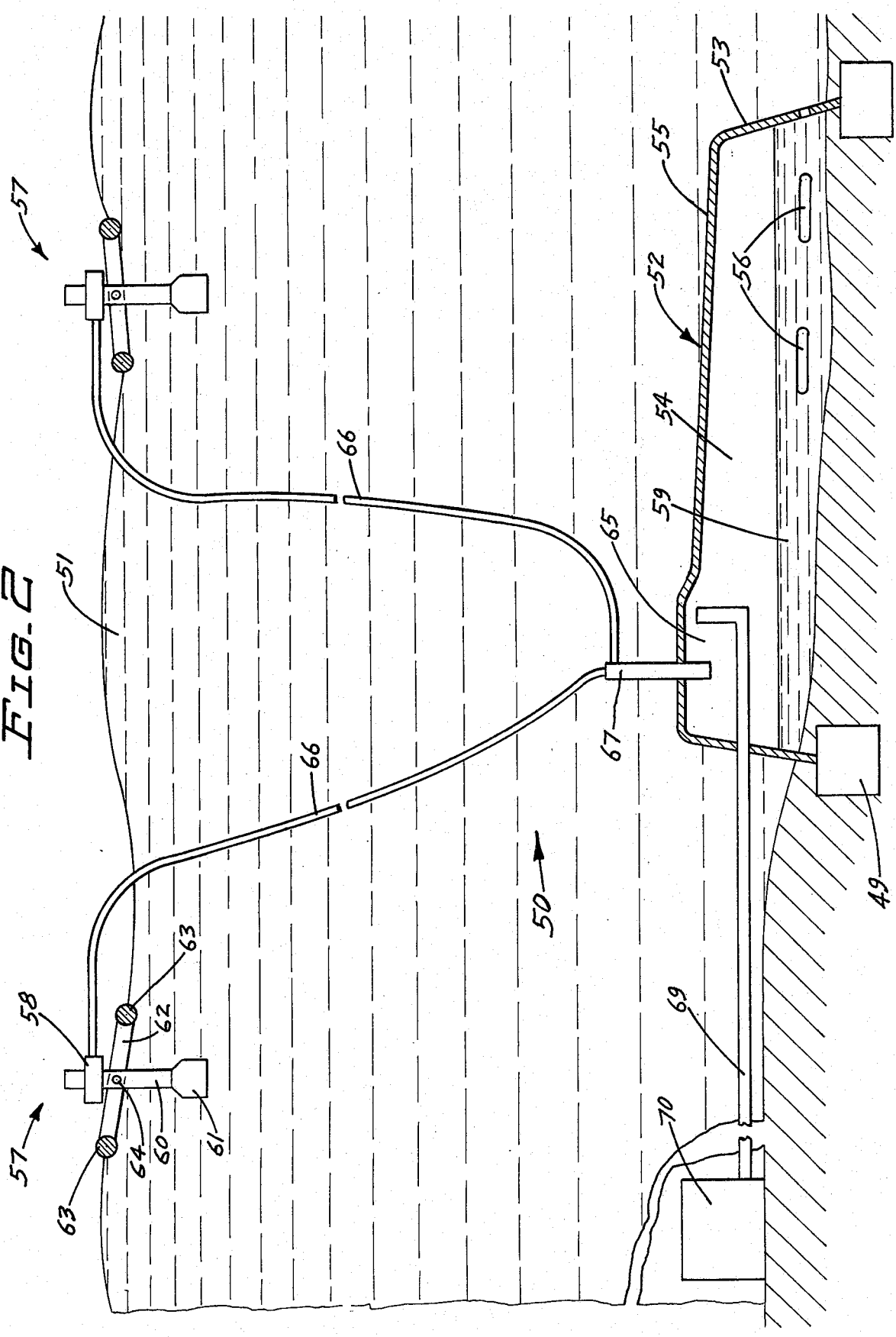

ENERGY STORAGE SYSTEM

BACKGROUND OF THE INVENTION

Natural elements are the source of a vast supply of unused energy. The sun, wind, tides, ocean waves, and river currents, along with other natural phenomena, provide sufficient energy amounts to meet most energy needs. A difficulty resides in the fact that the energy from natural elements is not available upon demand. For example, wind power is available only when and where the wind is blowing.

Various devices have been proposed and used for deriving power from natural elements. For example, see U.S. Pat. No. 1,005,911 to Wilbur and U.S. Pat. No. 655,541 to Becker. In the former patent, water entrained with air is delivered by wave power to an underground cell where the water separates from the air and is there under pressure to perform a work function. Likewise, wave power is used in the latter patent to compress air for a work function. A problem exists in the storage of energy derived from machines which operate from natural elements. Compressed air is storable in tanks having a fixed volume. See U.S. Pat. No. 341,021 to Kierter. But such tanks are of limited capacity and the pressure of the air stored in the tank will vary according to the amount of air stored therein. Systems have been proposed for storage of air under pressure in natural formations under the surface of the earth. See U.S. Pat. No. 2,454,058 to Hays.

SUMMARY OF THE INVENTION

The invention relates to a system and apparatus for the storage of energy generated by natural elements. A compressed air storage cell is located substantially beneath the top surface of a body of water as by being located deep underground or on an ocean floor. A plurality of air compressors are functionable to pump air into the storage cell. The lower portion of the storage cell is in communication with the body of water. Air under pressure is pumped into the top of the storage cell by the air compressors. As air is pumped into the storage cell, it displaces water located in the storage cell forcing it into the body of water. The pressure of the air in the storage cell is determined by the depth of the storage cell or the distance of the storage cell beneath the top surface of the body of water. The air compressors are operated by machines which derive kinetic energy from natural elements. Such machines include windmills, wave action machines, solar operated machines, tidal operated machines, and the like. Upon demand, air is drawn under pressure from the storage cell and used to provide a work function as driving an electricity producing turbine. As air is drawn out of the storage cell to perform a work function, the water level in the cell rises. The air in the storage cell is thus maintained at a relatively constant pressure.

IN THE DRAWINGS

FIG. 1 is a diagrammatic view of a first embodiment of an energy storage system of the invention partly in section for purposes of illustration; and FIG. 2 is a diagrammatic view of a second embodiment of an energy storage system of the invention partly in section for purposes of illustration.

DESCRIPTION OF PREFERRED EMBODIMENTS

Figure 1:
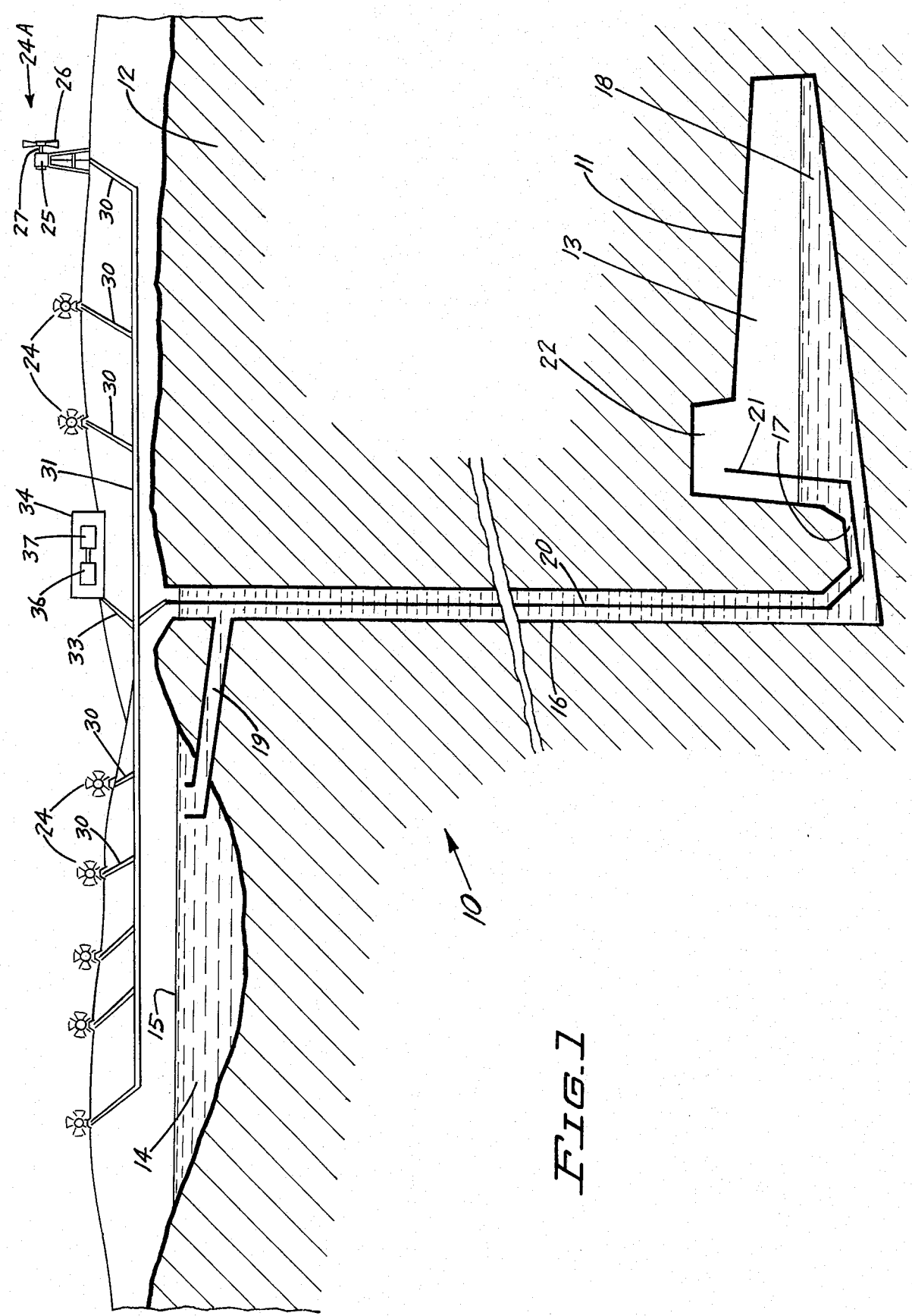

Referring to the drawings, there is shown in FIG. 1 an energy storage system of the present invention indicated generally at 10. Energy storage system 10 includes a closed, underground compressed air storage housing or cell 11 defining a closed chamber 13. Storage cell 11 is located substantially beneath the surface of ground 12, for example, approximately 600 feet below the ground level surface. Storage cell 11 can be man-made or natural so long as it is closed and able to contain a supply of compressed air.

Energy storage system 10 utilizes a first body or reservoir of water 14 having a surface or interface 15 located substantially above storage cell 11 and experiencing atmospheric pressure. Water reservoir 14 can be a lake, a river, a city water supply or other large water source. A generally vertical water passage or shaft 16 extends downwardly from the ground surface opening as at 17 to the lower portion of storage cell 11. At the upper end of water shaft 16, an arm 19 extends to water reservoir 14 to permit flow of water between reservoir 14 and compressed air cell 11 through the opening 17. A second water body 18 in the lower portion of chamber 13 and water in shaft 16 exert pressure to lock or trap compressed air in the chamber.

A main air line 20 extends from the surface of ground 12 downwardly to storage cell 11, having an end 21 terminating in chamber 13 at an enlarged upper portion or dome 22 of storage cell 11. For convenience, air line 20 extends downwardly through the water shaft 16, entering opening 17 of chamber 13 and extending upward to upper portion 22 providing for air passage to and from the chamber.

A plurality of machines 24 are located on the surface of ground 12 which are operable to pump air under pressure down through air line 20 into chamber 13. Compressed air enters chamber 13 and displaces water located therein. The compressed air moves the water outward through water shaft 16 back into reservoir 14. Each machine 24 includes an air compressor, indicated at 25, for compressing atmospheric air and delivering it to air line 20. Machines 24 are driven by natural elements and, by way of example, as shown at 24A, can comprise wind-driven machines of the windmill variety. Wind machine 24A includes a blade assembly 26 rotatable responsive to wind to turn a drive shaft 27. Drive shaft 27 is functionally connected to compressor 25 for operation thereof. Machines 24 could be comprised of other types of machines which operate responsive to natural phenomena such as the sun, nautical waves, tides, currents, and such. A combination of such machines can usefully be employed.

The compressor 25 of each machine 24 delivers compressed air through an air branch 30 to a common air manifold 31. Air manifold 31 connects to main air line 20 providing a direct path to chamber 13 of storage cell 11 for storage of air under pressure.

Also connected to manifold 31 and extending therefrom is an air delivery line 33 which extends to a physical facility 34 where useful work is derived upon demand from the compressed air. For example, delivery line 33 can lead to an air turbine 36 which drives an electric generator 37. Air is delivered to physical facility 34 upon demand from the machines 24 or, if their output is insufficient, from storage cell 11.

In the use of energy storage system 10, responsive to the wind, the machines 24 operate to deliver compressed air to the air manifold 31. When physical facility 34 is not in use, air under pressure is diverted through the main air line 20 and delivered to the chamber 13. Air under pressure entering the chamber 13 against the pressure of water body 18 displaces part of the water located therein which is moved to reservoir 14. The air located in chamber 13 remains at approximately a constant pressure regardless of the volume. The pressure of the air in chamber 13 is determined by the height of water shaft 16 and the atmospheric pressure operating on the water reservoir 14. At a depth of approximately 600 feet, the air in the chamber 13 will be at a pressure of approximately 275 psi.

When physical facility 34 is operative, air under pressure is derived from the machines 24. If the machines are unable to supply the required amount of air under pressure, then compressed air from the chamber 13 of storage cell 11 is used. Machines 24, for example, may not be able to supply the prerequisite amount of air under pressure on a windless day or at time when the requirements of physical facility 34 are high. As compressed air is used from chamber 13, the water level therein rises, deriving water from reservoir 14. The volume of air located in the chamber 13 is thus reduced, but the presence is maintained relatively constant. Providing air at constant pressure simplifies the design and lowers the expense of air turbine 36.

Referring to FIG. 2, there is shown a second embodiment of an energy storage system according to the present invention, indicated generally at 50. Energy storage system 50 is located in an ocean 51 or some other vast natural water body of the type which abundantly grace the surface of the earth. Energy storage system 50 includes a large, compressed air storage housing or cell 52 anchored on the ocean bottom and having side walls 53 and a top wall 55 defining a compressed air storage chamber 54. A plurality of slots or water ports 56 on storage cell 52 are open to the lower portion of chamber 54. Water ports 56 permit flow of ocean water into and out of chamber 54 responsive to the amount of compressed air stored in the chamber. A body of water 59 is located in chamber 54. An anchor 49 attached to the lower edge of side wall 53 secures cell 52 on the ocean bottom.

A plurality of machines 57 are located floating on the surface of ocean 51, each machine operable to drive an air compressor 58 to pump air under pressure into air storage cell 52 against the pressure exerted by water body 59 in chamber 54. Machines 57 are driven by natural elements or natural phenomena such as wind, ocean waves, tidal power, ocean currents, or the like. For example, machine 57 can operate on wave power, having a vertical column 60 with end ballast 61. A cross arm 62 has end floats 63 and is pivotally connected to column 60 by drive shaft 64. Ballast 61 maintains the column 60 generally vertical in the water. Under the action of waves, cross arm 62 rotates relative to column 60 to move drive shaft 64 and operate compressor 58. Numerous other forms of machines 57 could be employed to pump air into the air storage cell 52. Ocean surfaces present vast expanses of areas suitable for accommodating such machines. A combination of such machines being operated by the sun, the wind, or the like, can be provided.

An air branch line 66 leads from each machine 57 to carry compressed air to a main air line 67. Main air line 67 passes into a dome 65 of chamber 54 to deliver compressed air thereto. An air delivery line 69 extends from the chamber 54 of air storage cell 52 to a remote facility indicated at 70 where compressed air is usable upon demand to perform a work function, for example, as that described earlier relative to the energy storage system 10 of FIG. 1.

In use of the energy storage system 50, machines 57 operate compressors 58 to pump air under pressure through branch lines 66 and main air line 67 into chamber 54 of compressed air storage cell 52. Storage cell 52 can be located approximately 600 to 1000 feet beneath the surface of ocean 51. The pressure of the air in chamber 54 is maintained substantially constant. As air is pumped in, it displaces part of water body 59 which exits through ports 56. Upon demand, air is drawn from chamber 54 through delivery line 69 to perform a work function. As air is drawn from chamber 54, the water level rises as water enters through the ports 56.

As shown and described, the energy storage system derives compressed air from machines operable by natural elements. The energy storage system is also usable to store engery, which is generated by conventional power plants during non-peak periods of the day. The stored energy is then usable during peak usage periods of the day to supplement the normal production of the power plant.

The embodiments of the invention in which an exclusive property or privilege is claimed are defined as follows:

1. An energy storage apparatus usable in conjunction with a natural water body, said apparatus comprising:
   a compressed air storage cell located at the bottom of said water body and defining a closed chamber to hold a supply of air under pressure;
   the lower portion of said cell having water ports opening to said chamber to permit passage of water between the chamber and the water body whereby water in the chamber exerts and maintains pressure upon air located in the chamber;
   air inlet means to the chamber;
   means to pump air into the chamber through the air inlet means against the pressure of water in the chamber and displace a portion of water from the chamber for storage of air under pressure;
   said means to pump air including at least one air compressor and a machine of the type driven by a natural element to operate the air compressor, said machine being floatable on the surface of said water body; and
   air outlet means to extract air under pressure from the chamber for the performance of a work function.

2. The energy storage apparatus of claim 1 wherein: said machine is a machine driven by nautical wave power.

3. The energy storage apparatus of claim 1 wherein: said machine is a machine driven by wind power.

4. The energy storage apparatus of claim 1 wherein: said machine is a machine driven by solar power.

* * * * *

UNITED STATES PATENT AND TRADEMARK OFFICE
CERTIFICATE OF CORRECTION

PATENT NO. : 3,996,741
DATED : December 14, 1976
INVENTOR(S) : Geroge M. Herberg It is certified that error appears in the above-identified patent and that said Letters Patent are hereby corrected as shown below:

Column 3, line 25, "presence" should be --pressure--.

Column 4, line 26, "engery" should be --energy--.

Signed and Sealed this

Twenty-ninth Day of March 1977

[SEAL]

Attest:

RUTH C. MASON
*Attesting Officer*

C. MARSHALL DANN
*Commissioner of Patents and Trademarks*